Figure 1:
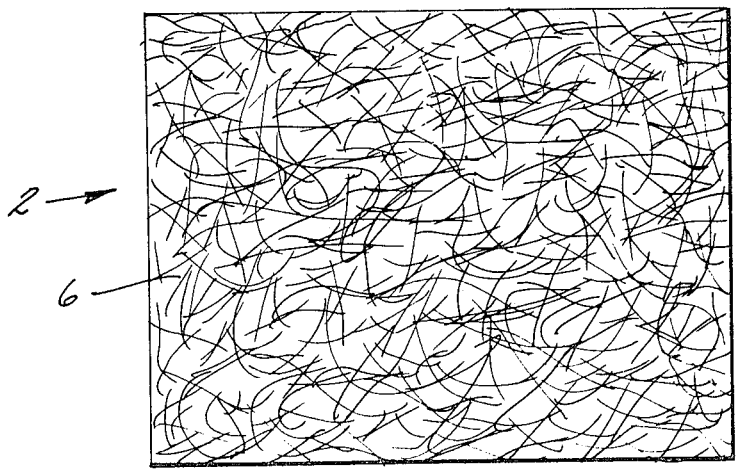

United States Patent

[11] 3,628,985

[72] Inventors Shibley A. Hider;
Walter Kitaj; Robert E. Martin, all of Toledo, Ohio
[21] Appl. No. 834,606
[22] Filed June 10, 1969
[45] Patented Dec. 21, 1971
[73] Assignee Owens-Illinois, Inc.
Continuation of application Ser. No. 503,760, Oct. 23, 1965, now abandoned. This application June 10, 1969, Ser. No. 834,606

[54] ORGANOPOLYSILOXANE IMPREGNATED FIBROUS SHEET AND METHOD OF PRODUCING SAME
7 Claims, 2 Drawing Figs.

[52] U.S. Cl. .................................................. 117/46, 117/126, 117/132
[51] Int. Cl. ....................................................... C03c 25/02

[50] Field of Search ........................................... 117/126 GS, 132 BS, 46 FA, 46 CA, 121

[56] References Cited
UNITED STATES PATENTS
2,706,190  4/1955  Clark ........................... 260/46.5
2,893,898  7/1959  Evans et al. ..................... 117/161

Primary Examiner—Alfred L. Leavitt
Assistant Examiner—William E. Ball
Attorneys—W. A. Schaich and D. R. Bahr ABSTRACT: A fibrous web impregnated with an organopolysiloxane which is cured thereon, wherein the web has superior dielectric and heat-resistant properties and is useful as an insulating medium and, optionally, a rigid fibrous web having its resin and/or fiber portion carbonized. A process of impregnating the fibrous web with the organopolysiloxane in liquid or powder form and curing the siloxane thereon, and, optionally, carbonizing the resin and/or fiber portion of the web whereby the resulting carbonized structure retains its rigidity.

INVENTORS
SHIBLEY A. HIDER &
WALTER KITAJ
BY ROBERT E. MARTIN
Donald R. Bohn &
W. A. Schaich
ATTORNEYS

ORGANOPOLYSILOXANE IMPREGNATED FIBROUS SHEET AND METHOD OF PRODUCING SAME

"This application is a continuation of application Ser. No. 503,760, filed Oct. 23, 1965, now abandoned."

This invention relates to a fibrous sheet which is impregnated with an organopolysiloxane resin. More specifically, this invention is concerned with a fibrous sheet that can be manufactured on standard paper making machinery, wherein the fibrous sheet is impregnated with a trifunctional organopolysiloxane resin. Processes wherein the impregnated sheets of this invention are manufactured are also within the purview of this invention.

The prior art teaches that certain types of paper and other fibrous structures can be treated with certain mono and difunctional organopolysiloxane resins. These prior art treatments are usually for purposes of waterproofing. The prior art does not teach the complete impregnation of a fibrous web with a trifunctional organopolysiloxane resin. Likewise, the prior art does not teach the treatment of a fibrous sheet with a powdered thermoplastic trifunctional organopolysiloxane resin.

Accordingly, the objects of this invention are the preparation of a superior fibrous web structure which is impregnated with an organopolysiloxane resin.

A more preferred object of this invention is the preparation of a fibrous sheet which is impregnated with a trifunctional organopolysiloxane resin. The objects of this invention also include processes for the preparation of the impregnated organopolysiloxane structures of this invention. Finally, the objects of this invention include all the other novel features which will be obvious from the specification and claims at hand.

Figure 2:
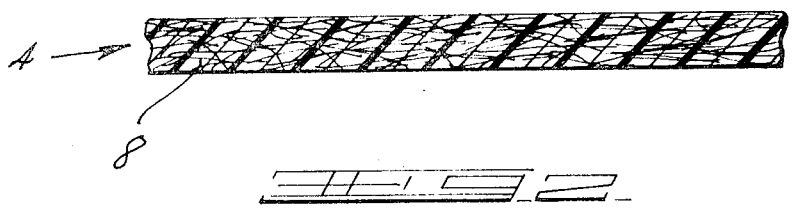

The subject invention is illustrated in FIGS. 1 and 2. FIG. 1 represents a view of the fibrous web 2, having a plurality of individual fibers 6. FIG. 2 represents a cross section showing sheet 4, wherein the individual fibers are secured in position with an organopolysiloxane resin matrix 8.

Web 2 is formed from a plurality of fibers 6. Web 2 can be formed by many methods which are obvious to one skilled in the paper art. For example, it can be formed from a slurry on a batch basis or in a continuous fashion utilizing a machine such as a fourdrinier paper making machine. The only requirement necessary in the formation of web 2, is that the fibers must be present in such number and in such a way that there is adequate fiber-to-fiber contact to permit the formation of a rigid or semirigid web. Because the fibers 6 of web 2 are orientated in a single plane, the resulting impregnated sheet 4 is somewhat flexible. This is to be contrasted with a filled system wherein the filler is randomly orientated with the result that the resulting product is brittle.

Fiber 6 can be any fibrous material such as cellulosic, inorganic, plastic or metallic type fibers or mixtures of these fibers.

Cellulosic materials adapted for use in this invention include wood cellulose and pulps derived from hardwoods, softwoods, and woody annual plants such as balsam fir, eastern hemlock, jack pine, eastern white pine, red pine, black spruce, red spruce, white spruce, tamarack, cyprus, quaking aspen, American beech, paper birch, yellow birch, eastern cottonwood, sugar maple, silver maple, yellow poplar, black cherry, white oak, bagasse, hemp, cotton and jute; mixtures of cellulosic materials can also be used.

When cellulosic type fibers are utilized these fibers may be pretreated by soaking in water and solvent exchanged with anhydrous methyl alcohol in order to achieve a fiber that is more susceptible to impregnation.

Examples of inorganic fibers from which can be utilized are glass, asbestos, titanium dioxide, aluminum oxide, etc.

Examples of suitable synthetic fibers are those that are formed from both homopolymeric and copolymeric substances, such as (1) vinyl resins formed by the polymerization of vinyl halides or by the copolymerization of vinyl halides with unsaturated polymerizable compounds, e.g., vinyl esters, $\alpha,\beta$-unsaturated acids, $\alpha,\beta$-unsaturated esters, $\alpha,\beta$-unsaturated ketones, $\alpha,\beta$-unsaturated aldehydes and unsaturated hydrocarbons such as butadienes and styrenes; (2) poly-$\alpha$-olefins such as polyethylene, polypropylene, polybutylene, polyisoprene and the like, including copolymers of poly-$\alpha$-olefins; (2) polyurethanes such as are prepared from polyols and organic polyisocyanates; (4) polyamides such as polyhexamethylene adipamide; (5) polyesters such as polymethylene terephthalates; (6) polycarbonates; (7) polyacetals; (8) polyethylene oxide; (9) polystyrene, including polymers of styrene with monomeric compounds such as acrylonitrile and butadiene; (10) acrylic resins are exemplified by the polymers of methyl acrylate, acrylamide, methylol acrylamide, acrylonitrile, and copolymers of these with styrene, vinyl pyridines; etc. (11) neoprene; (12) condensates of aldehydes, especially formaldehyde and formaldehyde engendering substances such as paraformaldehyde; (13) modified and unmodified condensates of hydroxy benzenes like phenol, resorcinol, etc., with the aforementioned aldehydes; (14) silicones such as dimethyl and methyl hydrogen polysiloxanes; (15) unsaturated polyesters; and (16) cellulose esters including the nitrate, acetate, propionate, etc. This list is not meant to be limiting or exhaustive but merely to illustrate the wide range of polymeric materials which may be employed in the present invention. Fibers formed from polyamides, polyesters, polyaldehydes polyolefins and acrylics are particularly suited for use in this invention.

Examples of suitable metallic type fibers are fibers formed from metals such as iron, copper, brass, aluminum, stainless steel, magnesium, titanium, etc.

Organopolysiloxane compounds which are adapted for use as matrix 8 in the subject invention are produced by the hydrolysis and condensation of at least one compound embraced by formula I

$$\text{I} \quad T_n SiZ_{(4-n)}$$

wherein T independently generally represents a member such as alkyl, alkenyl and aryl. More specifically, T is independently a member such as alkyl, e.g., methyl, ethyl and propyl through hexyl (both normal and isomeric forms), cyclopenyl, cyclohexyl, vinyl and the normal and isomeric forms of propenyl through hexenyl and phenyl.

Z independently generally represents a hydrolyzable group. More specifically, Z is independently a member such as halogen (chloride, bromine, fluorine, and iodine), alkoxy (e.g., methoxy through heptoxy), and acyloxy (e.g., acetoxy, propionoxy, butyroxy, pentanoxy, hexanoxy, etc.) and arloxy, e.g., phenoxy.

$n$ represents a positive integer of less than four, but is preferably one.

In formula I, as given above for substituent Z alkoxy groups are preferred because their hydrolysis products are less acidic, and therefore the silane condensation can be better controlled. Alkoxy groups of less than five carbon atoms are especially advantageous (and are preferred), because the rate of hydrolysis can be inconveniently slow when the organic hydrolyzable radical(s) have a higher molecular weight (i.e., more carbon atoms).

It will be understood, of course, by those skilled in the art that some or all of the Z's in formula I can also represent an —OH group. Hence, the term "hydrolyzable" as used herein and in the appended claims is intended to include within its meaning compounds wherein the hydrolyzable group or groups have already been hydrolyzed to an —OH group or groups, unless it is clear from the context that the more limited meaning is intended. The terms "hydrolysis" product and "condensation" product as used in the preceding paragraph and elsewhere in this specification, and in the appended claims, are intended to include within their meaning the co-hydrolysis and co-condensation products that result when mixtures of silicon-containing starting reactants are employed.

Preferred organosilane monomers adapted for use in this invention consist essentially of a compound represented by Formula II II 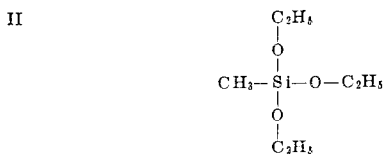

or a mixture of compounds as represented by formulas III and IV

III 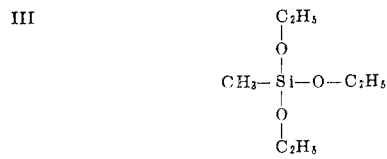

IV 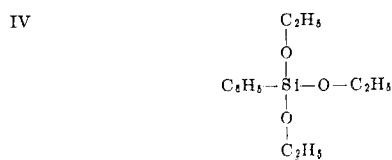

During the in situ hydrolysis and polymerization compounds III and IV link together to form a copolymer. The molar ratio of the compound as represented by formula III to the compound as represented by formula IV can be from 1:10 to 10:1 with a more preferred ratio being 1:5 to 5:1. A most preferred composition is produced by the hydrolysis and condensation of 2 moles of the compound as represented by formula III with one mole of the compound as represented by formula IV. Up to 10 mole percent but preferably up to 5 mole percent of diphenylsilanediol can be incorporated into the copolymer that is produced by the condensation of compounds as are represented by formula III and IV by co-condensation.

In the subject invention at least one monomeric organosilane compound as is represented by formula I, II, III and IV is converted into a solid organopolysiloxane compound by the following general procedure. The organosilane compound or compounds are hydrolyzed at a temperature of from about 50° to about 80° C. for a period of time of from about 1 to about 10 hours, in the presence of water. The temperature is then raised to from about 100° to about 300° C. for a period of time of from about 1 to about 30 minutes to effect the removal of the byproduct alcohol and excess water. This also effects the further condensation of the product to produce a heat-curable organopolysiloxane. The heat-curable organopolysiloxane is then partially cured at a temperature of from about 90° to about 185° C. for a period of time of from about ½ to about 24 hours. This partially cured product is the finally cured at a temperature of from about 90° to about 200° C. for a period of time of from about 4 to about 168 hours.

During condensation the above discussed organosilane compounds cross-link to form compounds that exhibit exceptional physical properties such as stability and hardness.

The composition and preparation of the monomeric organosilane compounds and their subsequent polymerization and copolymerization is fully discussed in copending U.S. Pat. Application, Ser. No. 306,344, filed Sept. 3, 1963, and U.S. Pat. application, Ser. No. 370,684, filed May 27, 1964, these applications having an assignee that is common with the assignee of this invention and are now abandoned.

The invention at hand is also adapted to utilize a thermoplastic powder form of the above described organopolysiloxane resins. These thermoplastic organopolysiloxane resins can be produced by the alteration of the above described partial curing step or by the alteration of the final curing step. More specifically, if the partial curing step is carried out at a temperature of from 10°-20° C. below the gel point of the resin on cooling to room temperature, a thermoplastic resin results. Likewise, a thermoplastic resin will result when condensation and partial curing steps are carried out as described above, but the final cure is interrupted before complete polymerization is effected. These thermoplastic organopolysiloxane powdered resins are advantageous during the impregnation of the fibrous web due to their ease of application. However, it should be noted that after the desired article is shaped and the final cure is effected, these thermoplastic resins revert to thermosetting resins.

The formulation, polymerization and application of the monomeric organosilane compounds and organopolysiloxane compounds of this invention is carried out in the presence of a solvent such as methanol, ethanol, butanol, acetone, ethyl acetate, benzene, xylene, toluene, ethylene glycol monomethyl ether, ethylene glycol monomethyl ether acetate, ethylene glycol ethyl ether, ethylene glycol ethyl ether acetate, ethylene glycol ethyl butyl ether, ethylene glycol butyl ether acetate, ethylene glycol dibutyl ether, ethylene glycol monohexyl ether, ethylene glycol monophenyl ether, etc.

The impregnated fibrous sheets of this invention are useful for the manufacture of any object where excellent dielectric and heat resistant properties are useful. For example, the fibrous sheets of this invention are suitable for use as insulating media in transformers.

The fibrous sheets of this invention are particularly desirable for use at elevated temperatures, in that even though the organic fibers and resin may carbonize at high temperatures, the structure itself retains its structural rigidity. Likewise, a high percentage of its strength is retained. This carbonizing of the web and resin matrix can be deliberately effected in order to produce a special application fibrous impregnated sheet. This precarbonizing step is desirable when the out-gassing and fire hazard during in situ carbonizing is undesirable. etc., The structures of this invention which utilize a cellulosic or synthetic fiber web may be utilized at temperatures up to about 300° C. However, for extreme high temperature use, structures which utilize an inorganic web such as glass, asbestos, titanium dioxide, aluminum dioxide, etc., are preferred. These structures are useful up to a temperature of about 700° C.

The fibrous structures of this invention can be prepared by impregnation of web 6, with either a solid thermoplastic organopolysiloxane resin or a solvent solution of an organopolysiloxane resin.

When the solvent solution is utilized the web is impregnated with the solvent solution in a conventional manner, for example by spraying, dipping, brushing, etc. Solvents as described above are suitable for use in this phase of the subject invention.

After application of the organopolysiloxane compositions of this invention to the web, the solvent component is evaporated and a precure effected at a temperature of from about 25° to about 185° C. Following the removal of the solvent, the final curing is effected at a temperature of from about 80° to about 100° C. for a period of time of about 8 to about 24 hours. A more preferred range of operating conditions is to evaporate the solvent and precure at a temperature of from about 130° to about 140° C., followed by a final cure at a temperature of from about 90° to about 100° C. for from about 8 to about 12 hours at 65 percent relative humidity. While a relative humidity of 65 percent is preferred, the curing can be carried out at any relative humidity of from about 5 to about 100 percent. During this curing sequence, pressure can also be applied. Pressures of from about 50 to about 600 p.s.i.g., can be utilized with a more preferred range being from about 150 to about 250 p.s.i.g.

The preformed fibrous web can likewise be coated by the application of a thermoplastic organopolysiloxane resin powder having a mesh size of 20 or less as described above. This thermoplastic organopolysiloxane resin is then driven into the web and the final cure effected by the application of at least one of heat and pressure.

Pressures of from about 50 to about 600 p.s.i.g. and temperature of from about 150° to about 250° C. of from about ¼ to about 2 hours are suitable for use in this phase of the subject invention. A more preferred range of operating conditions is at a temperature of from about 120° to about 175° C. at a pressure of from about 100 to about 300 p.s.i.g. for a period of time of from about 15 to about 30 minutes.

In regard to both of the above described curing processes, it could be stated that when high pressure and high temperature are utilized, a product having superior physical properties is produced. Examples of these physical properties are ring crush and tensile strength.

The finished impregnated fibrous structure as is shown in FIG. 2, can comprise by weight from about ¼ to about 200 percent fiber and from about 200 to about ¼ percent organopolysiloxane resin. A more preferred range is from about 40 to about 60 percent fiber and from about 60 to about 40 percent organopolysiloxane resin. A most preferred structure comprises 50 percent of a fiber mixture which comprises 90 percent glass fiber and 10 percent kraft pulp and 50 percent of methyl phenyl copolymer as is described in reference to formulas III and IV above. Prior to, during or subsequent to the final cure, the resulting impregnated sheet 4 can be shaped or otherwise formed into a finished article. For example, sheet 4 can be corrugated, formed into a container or laminated prior to, during or subsequent to the final cure.

It is within the purview of this invention to add to the compositions of this invention compatible materials which do not effect the basic and novel characteristics of the composition of this invention. Among such materials are coloring agents, including dyes and pigments, fillers and similar additives. Additives such as antioxidants, antistatic agents, stabilizers and antifoaming, may also be added. The upper limit of the quantity of additives is usually about 25 weight percent of the product.

The term "consisting of" as used in the definition of the ingredients present in the composition claimed is intended to exclude the presence of other materials in such amounts as to interfere substantially with the properties and characteristics possessed by the composition set forth but to permit the presence of other materials in such amounts as not substantially to affect said properties and characteristics adversely.

The following examples will illustrate the subject invention. These examples are given for the purpose of illustration and not for purposes of limiting this invention. All parts percent are given by weight unless otherwise specified.

EXAMPLE I

Approximately 20 grams of wet 20 percent kraft pulp refined to 55 second slowness as per TAPPI test T 227 m-58 "Freeness of Pulp" was mixed with 4 grams glass fiber and more water in an Osterizer. A sheet was then formed in a hand mold. The glass fiber was Beta fiber 150, 40 ply, ½ inch chopped fiber. Excess moisture was removed by pressing between filters. The sheet was then dried by passing through a drum drier. The dried sheet, weighing approximately 8 grams was dipped in a 40 percent solution of phenyl methyl organopolysiloxane in methyl alcohol. It was then air dried 20 minutes to evaporate most of the solvents. The methyl phenyl organopolysiloxane was prepared by reacting 2 moles of methyl triethoxysilane with one mole of phenyl triethoxysilane. Curing was effected by passing between steel plates for 1 hour at 270° F. at approximately 50 p.s.i.g. pressure. The cured sheet was tested for tensile strength and column crush with an untreated control.

The results were the following:

|  | Thickness, mil | Tensile strength, p.s.i.g. | | Column crush, lbs. | |
| --- | --- | --- | --- | --- | --- |
|  |  | Dry | Wet | Dry | Wet |
| Treated | 11 | 10,700 | 5,630 | 66 | 34 |
| Untreated | 14 | 2,290 | 150 | 10 |  |

EXAMPLE II

Two sheets of 50 percent kraft and 50 percent glass fiber were prepared as in example I, using pulps of different degree of refining
a. 26 sec. slowness
b. 80 sec. slowness These sheets were dried and after reconditioning were immersed in a 60 percent solution of methyl phenyl organopolysiloxane in methanol. The resin and curing procedure was identical to resin and procedure as is described in example I.

The results of the testing were as follows:

|  | Thickness, mil | Tensile strength, p.s.i.g. | | Short column, lbs. | |
| --- | --- | --- | --- | --- | --- |
|  |  | Dry | Wet | Dry | Wet |
| (a) Treated | 16 | 9,000 | 3,000 | 114 | 45 |
| (a) Untreated | 15 | 2,820 | 94 |  |  |
| (b) Treated | 13 | 9,420 | 3,400 | 55 | 27 |
| (b) Untreated | 11 | 4,900 | 240 |  |  |

It appears that the more refined pulp (b) yields lower short column, but equal tensile strength to that of the lesser refined pulp (a).

EXAMPLE III

A sheet containing 50 percent pulp and a 50 percent glass fiber was prepared as in example I. It was treated with a 50 percent solution of an organopolysiloxane resin in acetone that was prepared from a methyl triethoxysilane monomer. The impregnated sheet was pressed 1 hour at 300° F. and 200 p.s.i. (between Teflon plates) to effect curing. The treated sheets were more flexible than those in example I, where the methyl phenyl organopolysiloxane resin was used.

The test results follow:

|  | Thickness, mil | Tensile strength, p.s.i.g. | | Short column, lbs. | |
| --- | --- | --- | --- | --- | --- |
|  |  | Dry | Wet | Dry | Wet |
| Treated | 14 | 9,170 | 4,270 | 56 | 19 |
| Untreated | 14 | 2,290 | 150 | 10 |  |

EXAMPLE IV

Two sheets were prepared by the technique outlined in example I, using the resin and curing procedure of example I. The sheet was a 50/50 blend of pulp/glass fiber.

The sheet was then dipped in a 50 percent resin solution, as is described in example I, air dried for 15 minutes and pressed for 1 hour at 300° F. and 280 p.s.i.g.

The test results were the following:

|  | Thickness, mil | Tensile strength, p.s.i.g. | | Column crush, lbs. | |
| --- | --- | --- | --- | --- | --- |
|  |  | Dry | Wet | Dry | Wet |
| Treated | 14 | 12,100 | 9,430 | 165 | 63 |
| Untreated | 14 | 2,290 | 150 | 10 |  |

EXAMPLE V

Using the procedure, resins and testing procedures as is described in example IV, an impregnated sheet was prepared using 100 percent kraft pulp that was refined to 55 seconds. The test results were as follows:

EXAMPLE VI

A sheet was prepared using the same technique and resin as is described in example I, using 25 percent pulp fiber and 75 percent chopped glass fiber. The glass fiber was added in the sheet of the Osterizer. The impregnated sheet was then cured for ½ hour at 300 ° F. and 220 p.s.i.g. The test results were as follows:

|  | Thickness, mil | Tensile strength, p.s.i.g. | | Column crush, lbs. | |
| --- | --- | --- | --- | --- | --- |
|  |  | Dry | Wet | Dry | Wet |
| Treated | 14 | 13,600 | 12,600 | 143 | 103 |
| Untreated | 9 | 1,380 |  | 5 |  |

EXAMPLE VII

A set of 50/50 pulp/glass fiber sheets were prepared as in example I. It was treated with a methyl triethoxysilane (50 percent) as in example III. Two sheets were then laminated together, by pressing them while still wet with the resin solution, curing was then effected for 1 hour at 300° F. and 190 p.s.i.g.

The test results were as follows:

| | Thickness, mil | Tensile strength, p.s.i.g. | | Column crush, lbs. | |
|---|---|---|---|---|---|
| | | Dry | Wet | Dry | Wet |
| Treated | 20 | 11,900 | 7,250 | 266 | 101 |

EXAMPLE VIII

A set of kraft pulp sheet was made containing 10 to 40 percent of titanium dioxide pigment and asbestos fiber, based on the dry sheet before resin treating. Both additives were mixed with the pulp in the Osterizer and a sheet prepared in accordance with the description of example I.

They were treated with 50 percent acetone solution of a methyl phenyl organopolysiloxane resin, that was identical to the resin described in example I, and pressed without air drying at 290° F. and 300 p.s.i.g. for ½ hour. The test results were as follows:

| | Thickness, mil | Tensile strength, p.s.i.g. | | Stiffness, p.s.i.g. |
|---|---|---|---|---|
| | | Dry | Wet | |
| Pulp, no filler | 14 | 12,700 | | 596,000 |
| Pulp and 10% asbestos fiber | 14 | 12,200 | 8,580 | 692,500 |
| Pulp and 40% asbestos fiber | 15 | 10,400 | 6,610 | 812,100 |
| Pulp and 10% titanium dioxide | 15 | 10,800 | 7,180 | 534,000 |
| Pulp and 40% titanium dioxide | 12 | 9,260 | 6,560 | 494,300 |

EXAMPLE IX

Sheets consisting of pulp only and of 50/50 pulp/glass fiber were prepared and treated with an organopolysiloxane resin as per example I. The resin was heated for 1 hour to 140° F. to effect a partial cure. The resin was applied as a 25 percent solution in methanol. After 15 minutes of air drying, the sheets were pressed 1 hour at 300° F. and 300 p.s.i.g.

The test results were:

| | Thickness, mil | Tensile strength, p.s.i.g. | | Short column, lbs. | |
|---|---|---|---|---|---|
| | | Dry | Wet | Dry | Wet |
| Pulp sheet | 14 | 10,300 | 5,810 | 125 | 27 |
| Pulp/glass fiber sheet | 12 | 10,700 | 5,100 | 65 | 33 |

EXAMPLE X

A 50/50 pulp/glass fiber sheet was prepared in accordance with example I. It was treated with the solid thermoplastic resin powder instead of the solvent solution. The thermoplastic powder was a methyl phenyl copolymer that was prepared from 2 moles of methyl triethoxysilane and one mole of phenyl triethoxysilane. The resin was ground to 60 mesh and sprinkled on the pulp/glass fiber sheet. The coated sheet was then pressed for ½ hour at 300° F. and 270 p.s.i.g. This procedure cured the thermoplastic resin powder and effected its penetration throughout the sheet.

| | Thickness, mil | Tensile strength, p.s.i.g. | | Column crush, lbs. | |
|---|---|---|---|---|---|
| | | Dry | Wet | Dry | Wet |
| Treated sheet | 15 | 9,570 | 7,480 | 118 | 54 |

EXAMPLE XI

A series of sheets containing various proportions of pulp and glass fiber were prepared by the technique of example I. They were treated with the dry resin powder of methyl phenyl siloxane as is described in example X and pressed ½ hour at 300° F. and 270 p.s.i.g.

Only the sheets containing 100 percent glass-fiber had to be pressed at lower pressure of 50 p.s.i.g. to avoid slippage of the fibers in the resin and breakage.

This series was subjected to 48 hour heat exposure at 200° to 300° C. in order to carbonize the resin matrix and fibers that were susceptible to carbonization.

| Glass fiber | Pulp | Before heating | | | After 48 hours at 200° C. | | |
|---|---|---|---|---|---|---|---|
| | | p.s.i.g. dry tensile | Volts dry dielectric | Volts wet dielectric | Dry tensile | Volts dry dielectric | Volts wet dielectric |
| 0 | 100 | 13,400 | 10,000 | 3,500 | Brittle | 2,000 | 1,400 |
| 50 | 50 | 12,600 | 9,200 | 9,800 | 2,750 | 1,000 | 550 |
| 75 | 25 | 12,500 | 9,600 | 10,000 | 3,850 | 730 | 550 |
| 90 | 10 | 9,650 | 8,300 | | 9,210 | 1,900 | 1,350 |
| 100 | 0 | 10,400 | 1,100 | 800 | 5,670 | 930 | 500 |
| | | Before heating | | | After 48 hours at 300° C. | | |
| 50 | 50 | 13,000 | 7,000 | 9,700 | 366 | 1,000 | 100 |
| 75 | 25 | 11,000 | 9,000 | 10,000 | 1,550 | 1,100 | 500 |
| 90 | 10 | 12,400 | 6,000 | | 4,450 | 1,500 | 1,400 |
| 100 | 0 | 8,980 | 6,200 | | 2,610 | 950 | 400 |

This table shows that the combination of 90 percent glass fiber and 10 percent pulp fiber retained most tensile strength and dielectric resistance at 200° –300° C. At 300° C. most of the pulp and organic portion of the resin has been charred and the sample has a white color. Sheet containing pulp only was too weak to be tested after exposure to 300° C.

The dielectric test is a measure of the dielectric insulation efficiency. This test was run at 60 cycle AC and at a maximum of 14,000 volts.

The dielectric test results reported above, indicate the breakdown voltage. Above this voltage the composite sheets no longer functioned as a dielectric.

What is claimed is:

1. A fibrous sheet impregnated with a organopolysiloxane, said organopolysiloxane being a precured hydrolysis and condensation product of at least one organosilane monomer selected from the group consisting of methyltrialkoxysilane and a mixture of methyltrialkoxysilane and phenyltrialkoxysilane in which the alkoxy group contains less than five carbon atoms and water at about 50° to 80° C. for a period of time of from about 1 to about 10 hours to form a siloxane partial condensation product which is then heated at a temperature of from about 100° to about 300° C. for a period of time sufficient to effect the removal of the byproduct alcohol and excess water, after which the resultant product is precured by heating at a temperature below the gel point thereof and in the range of about 90° to 185° C. to provide a precure, and thereafter is finally cured in situ to produce a thermoset organopolysiloxane.

2. The fibrous sheet of claim 1, wherein the organopolysiloxane is produced by the hydrolysis and condensation of methyltriethoxysilane.

3. The fibrous sheet of claim 1, wherein the organopolysiloxane is produced by the hydrolysis and condensation of a mixture of methyltriethoxysilane and phenyltriethoxysilane.

4. The fibrous sheet of claim 1 comprising a fiber web having fibers selected from the group consisting of pine kraft, groundwood, semichemical hardwood, bleached hardwood soda, α-cellulose, asbestos, glass, or a fiber formed from a polyamide resin, polyester resin, polyolefin resin, acrylic resin, steel, aluminum, copper or brass which is fiber.

5. A process for the manufacture of an impregnated fibrous sheet which comprises the steps of forming a fiber web, impregnating said web with an organic solution of a further curable organopolysiloxane compound, said further curable organopolysiloxane compound being a precured hydrolysis and condensation product of at least one organosilane monomer selected from the group consisting of methyltrialkoxysilane and a mixture of methyltrialkoxysilane and phenyltrialkoxysilane in which the alkoxy group contains less than five carbon atoms and water at about 50° to 80° C. for a period of from about 1 to about 10 hours to form a siloxane partial condensation product which is then heated at a temperature of about 100° to 300° C. to remove alkanol byproduct and water, after which the resultant product is precured by heating at a temperature below the gel point thereof and in the range of about 90° to about 185° C. to provide the precured, further curable organopolysiloxane, evaporating the solvent for the organopolysiloxane from said solution and finally curing the organopolysiloxane to provide a thermoset organopolysiloxane impregnated fibrous sheet.

6. The process in accordance with claim 5 wherein said evaporation is carried out at from about 25° to about 185° C., said precure is carried out at a temperature from 10–20° C. below the gel point, and said final cure is carried out at temperature of from about 80° to about 100° C. at a relative humidity of from about 50 to about 100 percent.

7. A process in accordance with claim 5 wherein the resulting impregnated sheet is subsequently heated to a temperature sufficient to carbonize at least one of the fiber web and resinous matrix.

* * * * *

PO-1050 (5/69)

UNITED STATES PATENT OFFICE
CERTIFICATE OF CORRECTION

Patent No. 3,628,985      Dated December 21, 1971

Inventor(s) SHIBLEY A. HIDER, WALTER KITAJ and ROBERT E. MARTIN

It is certified that error appears in the above-identified patent and that said Letters Patent are hereby corrected as shown below:

Col. 2, line 5, "(2)" should be - - (3) - -

Col. 3, line 50, "the" should be - - then - -
Col. 3, line 52, before "hours" cancel "o"

Col. 4, line 30, cancel "etc.,"

Col. 5, line 24, "effect" should be - - affect - -

Col. 6, line 53, "procedures" should be - - procedure - -

Col. 6, lines 56-60, should read:

- - The test results were as follows:

|  | Thickness mil | Tensile Strength psig | | Column Crus lbs. | |
|---|---|---|---|---|---|
|  |  | Dry | Wet | Dry | Wet |
| treated | 14 | 9100 | 5980 | 110 | 33 |
| untreated |  | 3900 | 122 |  |  |

Signed and sealed this 11th day of July 1972.

(SEAL)
Attest:

EDWARD M. FLETCHER, JR.
Attesting Officer

ROBERT GOTTSCHALK
Commissioner of Patents